United States Patent
Laumen

(10) Patent No.: US 6,739,522 B2
(45) Date of Patent: May 25, 2004

(54) INJECTION SYSTEM FOR DOSED INJECTIONS OF TWO LIQUIDS INTO A REACTION CHAMBER

(75) Inventor: Hermann Josef Laumen, Heinsberg (DE)

(73) Assignee: FEV Motorentechnik GmbH, Aachen (DE)

( * ) Notice: Subject to any disclaimer, the term of this patent is extended or adjusted under 35 U.S.C. 154(b) by 0 days.

(21) Appl. No.: 10/203,421

(22) PCT Filed: Nov. 16, 2001

(86) PCT No.: PCT/EP01/13288
§ 371 (c)(1),
(2), (4) Date: Aug. 8, 2002

(87) PCT Pub. No.: WO02/46599
PCT Pub. Date: Jun. 13, 2002

(65) Prior Publication Data
US 2003/0010848 A1 Jan. 16, 2003

(30) Foreign Application Priority Data
Dec. 8, 2000 (DE) .......................................... 100 61 035

(51) Int. Cl.⁷ ................................................. B05B 7/12
(52) U.S. Cl. .................. 239/407; 239/419.5; 239/425.5
(58) Field of Search ................................ 239/303, 398, 239/407, 408, 406, 413, 419.5, 425.5, 419

(56) References Cited

U.S. PATENT DOCUMENTS

| | | | |
|---|---|---|---|
| 4,699,103 A | | 10/1987 | Tsukahara et al. |
| 4,798,329 A | * | 1/1989 | Mesenich ...................... 239/5 |
| 4,836,453 A | * | 6/1989 | Poehlman .................. 239/408 |
| 4,856,713 A | * | 8/1989 | Burnett ....................... 239/113 |
| 5,040,727 A | * | 8/1991 | Muntean et al. .............. 239/91 |
| 5,544,961 A | * | 8/1996 | Fuks et al. ................ 366/163.2 |
| 5,743,237 A | * | 4/1998 | Matta ........................ 123/496 |
| 5,890,459 A | * | 4/1999 | Hedrick et al. .......... 123/27 GE |
| 5,927,613 A | * | 7/1999 | Koyanagi et al. ......... 239/585.1 |
| 6,012,644 A | * | 1/2000 | Sturman et al. ............... 239/96 |
| 6,073,862 A | * | 6/2000 | Touchette et al. ............ 239/408 |
| 6,209,806 B1 | * | 4/2001 | Pace et al. ................ 239/585.5 |
| 6,336,598 B1 | * | 1/2002 | Touchette et al. ............ 239/408 |
| 6,431,471 B2 | * | 8/2002 | Anzinger et al. ......... 239/585.1 |

FOREIGN PATENT DOCUMENTS

| | | |
|---|---|---|
| DE | 30 12 418 A | 10/1981 |
| DE | 199 18 997 | 11/2000 |
| GB | 2035138 A * | 6/1980 |

OTHER PUBLICATIONS

Patent Abstracts of Japan, vol. 1997, No. 10, Oct. 31, 1997, JP 09 144606 a, (Mitsubishi Motors).

* cited by examiner

Primary Examiner—William E. Tapolcai
Assistant Examiner—Mohammad M. Ali
(74) Attorney, Agent, or Firm—Venable LLP; Robert Kinberg; Norman Kunitz

(57) ABSTRACT

The invention relates to an injection device for the metered injection of two liquids, in predeterminable quantity ratios, into a reaction chamber, the device having a housing (1) that includes an injection nozzle, the opening (13) of which forms an injection valve with the valve seat (14) in the housing (1) and a valve body (15) that can be positioned on the valve seat (14); the valve body (15) can be moved by a first actuator; the collection chamber (16) of the device is associated with the nozzle opening (13), and is connected to a supply line (17) for the first liquid (A) and a supply line (21) for the second liquid (B), with a metering valve (22) being set up to block at least one supply line (21) to the collection chamber, the valve being actuated by a second actuator; one of the two liquids is under a higher pressure than the other liquid; the device further has a control device (10), which can actuate the two actuators as a function of a load-stipulated total injection quantity and as a function of a predeterminable quantity ratio of the two liquids (A, B), with at least one valve being actuated in a clocked manner.

12 Claims, 5 Drawing Sheets

INJECTION SYSTEM FOR DOSED INJECTIONS OF TWO LIQUIDS INTO A REACTION CHAMBER

BACKGROUND OF THE INVENTION

Numerous applications necessitate the metered injection of two different liquids into a reaction chamber, in which the two liquids are allowed to react with one another. Such an application is a so-called reformer for a fuel cell, in which hydrogen and oxygen are essentially allowed to react to form water in a "cold combustion," thereby generating electrical energy.

The use of these fuel cells as an alternative for internal-combustion engines stipulates that sufficient quantities of hydrogen also be conveyed, in gaseous or cryogenic form, in a storage vessel. This requires a large structural space and high weight, and also represents a considerable potential danger.

It is therefore desirable to produce the hydrogen using a catalytic reformer immediately before the conversion in a fuel cell from other fuels, such as automobile fuel, diesel fuel or methanol. In a reformer of this type, the injected fuel reacts with additionally injected water to form carbon dioxide and hydrogen, which can then be converted into electrical energy in a known manner in the fuel cell.

Regarding fuel cells, DE 196 23 937 C1 and DE 199 18 997 A disclose mixing the two liquids in liquid or vapor form in the necessary ratio in advance, then supplying the mixture to the reactor or reformer. In DE 196 23 937 C1, varying load requirements are compensated through the maintenance of an ideal value for the mixture in a mixture-preparation stage; afterward, the supply of the two liquids is controlled. Adaptation to different load requirements is effected through the controlled extraction of the mixture from the mixture-preparation stage.

SUMMARY OF THE INVENTION

It is the object of the invention to create an injection device that allows two liquids—in the case of the fuel cell, fuel and water—to be metered directly into a reaction chamber via a common nozzle. Here, both the total quantity and the quantity ratio of the two liquids relative to one another are to be varied as a function of different operating points and/or changing load requirements.

In accordance with the invention, this object is accomplished by an injection device for the metered injection of two liquids, in predeterminable quantity ratios, into a reaction chamber, the device having a housing that includes an injection nozzle, the opening of which forms an injection valve with the valve seat in the housing and a valve body that can be positioned on the valve seat; the valve body can be moved by a first actuator; the collection chamber of the device is associated with the nozzle opening, and is connected to a supply line for the first liquid and a supply line for the second liquid, with a metering valve being set up to block at least one supply line to the collection chamber, the valve being actuated by a second actuator; one of the two liquids is under a higher pressure than the other liquid; the device further has a control device, which is connected to the two actuators and can actuate the two actuators as a function of a load-stipulated total injection quantity and as a function of a predeterminable quantity ratio of the two liquids, with at least one valve being actuated in a clocked manner. An injection device of this type allows the two liquids to be stored in the collection chamber of the injection device prior to the opening of the injection valve. Because a separate metering valve is provided for one of the liquids, preferably the liquid subjected to higher pressure, it is possible to introduce a predeterminable quantity of this liquid into the collection chamber of the injection device. If the nozzle opening is opened in the actuation of the injection valve, the pre-stored quantity of the one liquid is entrained by the incoming quantity of the other liquid. Thus, the total injection quantity can be injected directly into the reaction chamber as the two liquid components are mixed. The duration of the opening time of the injection valve determines the incoming quantity of the other liquid, preferably the liquid subjected to a lower pressure, both with respect to the partial quantity required for the reaction and the total injection quantity.

The arrangement of an additional metering valve that can be actuated independently of the injection valve, and in a clocked manner, offers numerous options for setting the total quantity of injected liquid, as well as for setting the quantity ratio of the two liquids to be injected. It is possible to establish different mixture ratios between these two liquids and the total quantity to be injected, not only due to the displacement of liquid out of the collection chamber during the opening time of the metering valve for the liquid under high pressure, the displacement allowing a matching quantity of liquid to be stored in advance in the collection chamber, but also through a temporary, overlapping opening of the metering valve with respect to the injection valve, or through an intermittent or clocked opening of the metering valve while the injection valve is open.

It is especially advantageous to position the discharge of the supply line for the liquid under the higher pressure near the valve seat of the valve body of the injection valve. In this case, when the liquid under the higher pressure is introduced into the collection chamber, the other liquid can be "pressed back" into its pressure chamber. Because the quantity of liquid stored in the collection chamber is under the pressure of the other liquid after the metering valve has been closed, when the injection valve is open and the metering valve is closed, the stored liquid is injected into the reaction chamber, followed after a slight delay by the other liquid, which guarantees a successful reaction.

In a further embodiment of the invention, it is provided that the actuators are electromagnetic, with the movable valve bodies of the injection valve and the metering valve respectively being connected to an armature and a restoring spring that acts in the closing direction. Such actuators can be controlled with high precision with respect to the opening period by a corresponding control device, so, following an appropriate calibration, an injection device is available that permits a very precise, as-needed actuation of the metering valve and/or the injection valve when the liquids are supplied to the injection device under preset pressures.

Further features and embodiments of the invention ensue from the claims.

BRIEF DESCRIPTION OF THE DRAWINGS

The invention is described in detail in conjunction with schematic drawings. Shown are in.

DETAILED DESCRIPTION OF THE INVENTION

Figure 1:
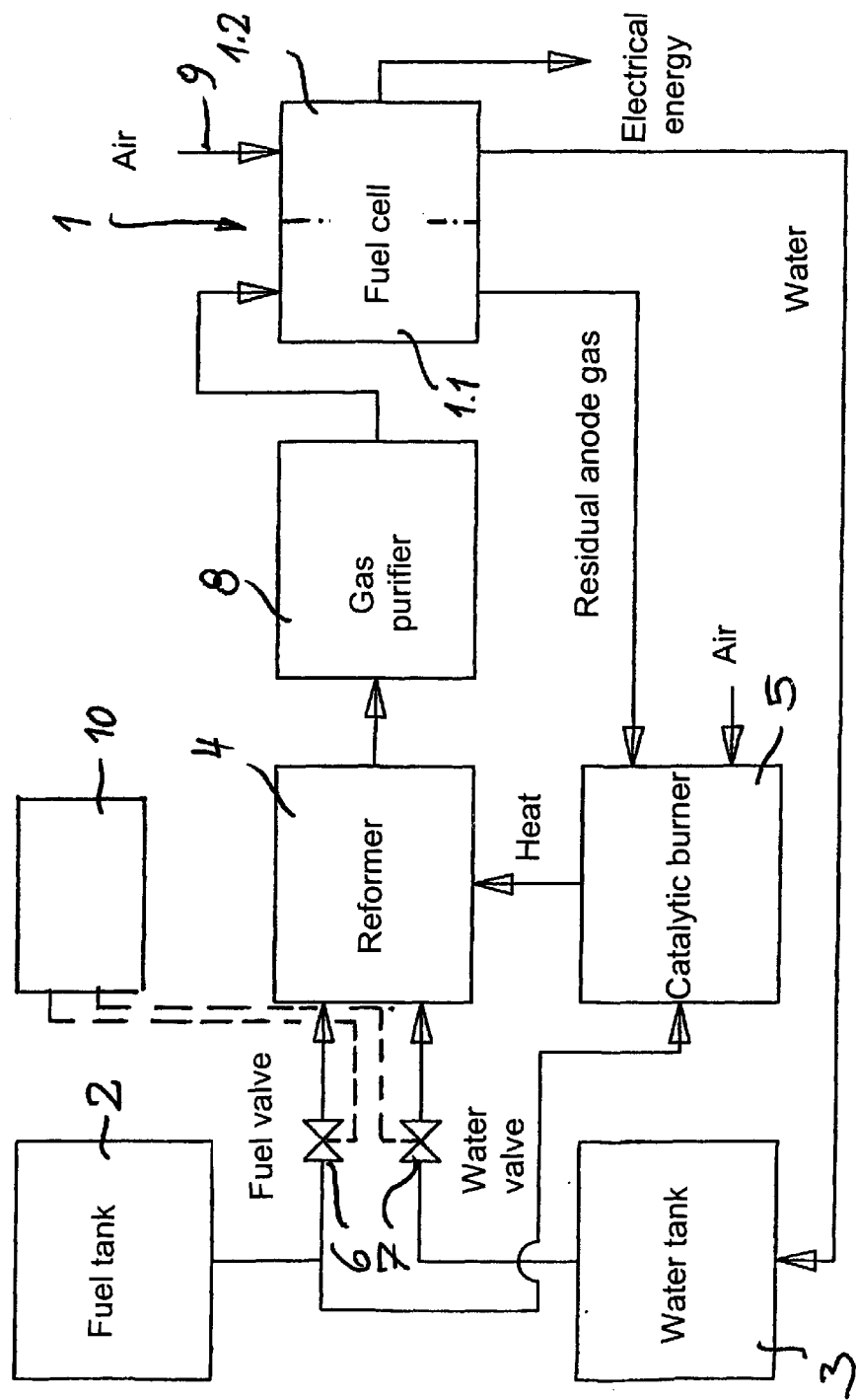
FIG. 1 a block diagram of a device for generating electrical energy using a fuel cell.

FIG. 1 illustrates, as an application example of an injection device according to the invention, a device for generating electrical energy using a fuel cell 1, in the form of a block diagram.

The fuel cell 1 is fed with a fuel, e.g., automobile fuel, diesel fuel or methanol, from a fuel tank 2, and with water from a water tank 3. For converting the fuel and water in the fuel cell 1, both liquids are converted into hydrogen in a reaction chamber 4, here a catalytic reformer; for this process, a heat source 5, such as a catalytic burner, must supply adequate reaction heat. Autothermic operation can also be chosen through the selection of the mixture ratio and with the addition of a corresponding air-mass flow.

The supply of fuel from the fuel tank 2, or another hydrocarbon from a corresponding supply tank, is metered by way of a valve 6, and the supply of water from the water tank 3 is metered by way of a valve 7, in predeterminable quantities.

The produced hydrogen gas is conducted out of the reformer 4 and to the anode side 1.1 via a gas purifier 8 of the fuel cell 1, and is converted there, in cooperation with the cathode side 1.2, into electrical energy. Air for the required conversions is additionally supplied to the fuel cell 1 on the cathode side via an intake 9.

Water is drawn off from the cathode side 1.2 of the fuel cell 1, then returned to the water tank 3.

So-called residual anode gas is further drawn off from the anode side 1.1 of the fuel cell 1, then supplied to the burner 5, which is embodied as a catalytic burner, and is converted there with air, and possibly additional fuel from the fuel tank 2, into heat for heating the reformer 4.

While it is basically possible to use a control device 10 to introduce both fuel and water, in a predetermined quantity ratio, into the reformer 4 by way of two separate injection nozzles with the correspondingly actuatable valves 6 and 7, the invention provides an injection valve that permits the metered supply of water and fuel, in a predetermined quantity ratio, by way of only a single injection nozzle.

Figure 2:
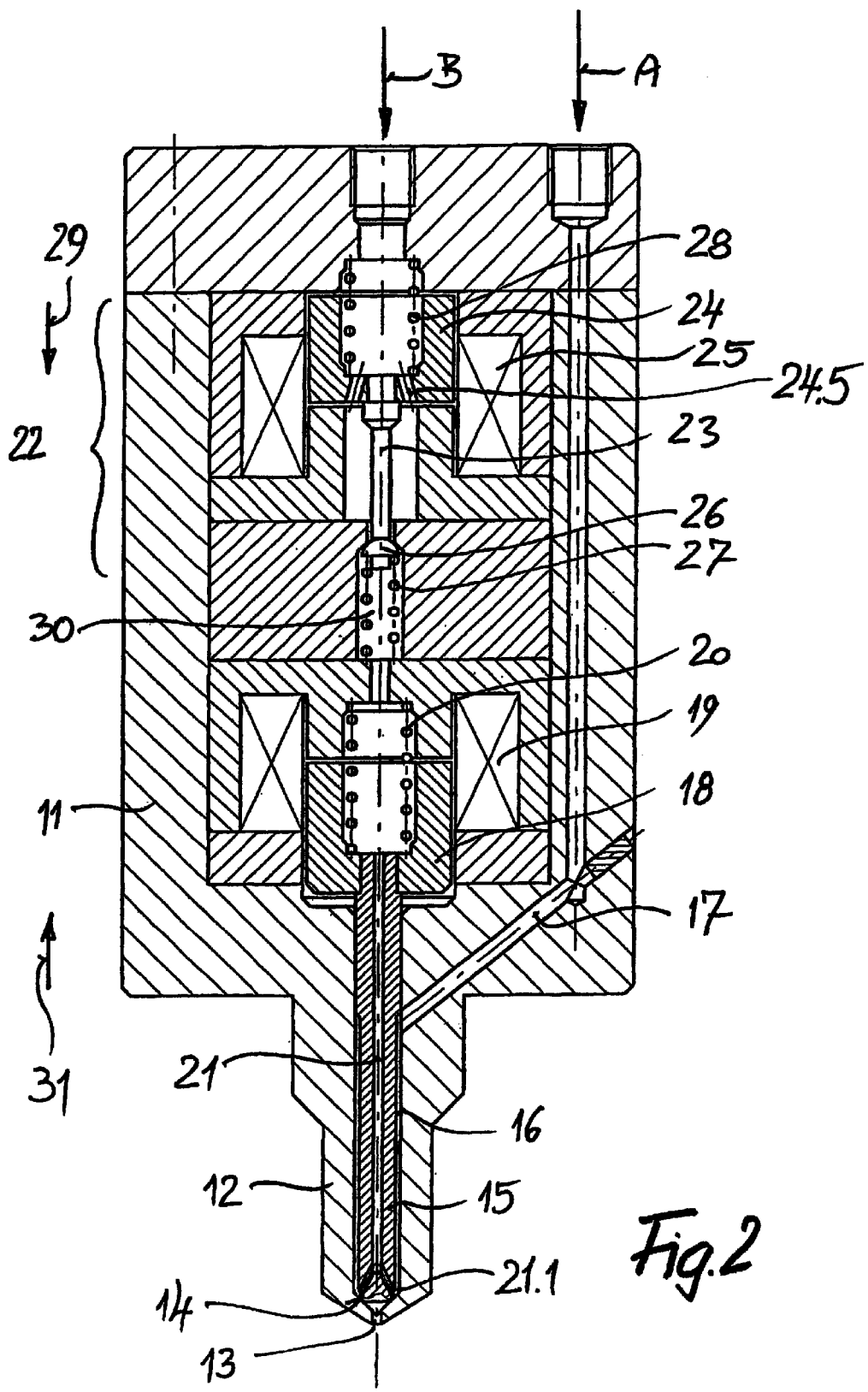
FIG. 2 a first exemplary embodiment of an injection device.

FIG. 2 illustrates an embodiment according to the invention. A housing 11 is provided with a projection 12 that can be inserted into a reaction chamber, and has a nozzle opening 13. Inside the projection 12 associated with the housing 11, a valve seat 14 and a valve body 15, which can be placed on the valve seat 14, are associated with the nozzle opening 13. The valve body 15 is surrounded by a collection chamber 16, into which a supply line 17 for a first liquid A discharges.

At the end remote from the nozzle opening 13, the valve body 15 is provided with an armature 18 in the housing 11, the armature having an associated electromagnet 19 that is connected—in a manner not shown in detail here—to a control device, such as the control device 10 of the arrangement in accordance with FIG. 1. A closing spring 20 presses the valve body 15 onto its valve seat 14. The armature 18 and the electromagnet 19, in connection with the restoring spring 20, form the first actuator. When the actuator is actuated, that is, the electromagnet 19 is supplied with current, the valve body 15 is raised from its valve seat 14 and unblocks the nozzle opening 13, so the first liquid A can be injected into the reaction chamber via the supply line 17.

In the illustrated embodiment, the valve body 15 is provided with a central supply conduit 21, which likewise discharges into the collection chamber 16 via lateral discharge openings 21.1 near the valve seat 14. The liquid B is supplied to the collection chamber 16 by way of a metering valve 22 that can be actuated with its own actuator.

In the illustrated embodiment, the metering valve 22 essentially comprises a tappet 23, which is connected to an armature 24 having an associated electromagnet 25 that is likewise connected to the control device 10. A valve body 26 embodied as a check valve is associated with the tappet 23; the restoring spring 27 of this valve is configured such that its closing force is greater than the pressing force that the liquid B exerts onto the closing body. The armature 24 is acted upon in the opening direction by a further spring 28, which, however, only exerts a low spring force, because this spring is intended to hold the entire arrangement without play.

When the second actuator, comprising the armature 24, the electromagnet 25 and the tappet 23, is activated and the armature 24 moves in the direction of the arrow 29, the valve body 26 is moved counter to the force of the restoring spring 27, so the liquid B can flow through the passages 24.5, the existing connecting conduit 30 and the supply line 21 in the valve body 15 and into the collection chamber 16 when the nozzle opening 13 is closed. The presupposition for this procedure is that the liquid B must be under a higher initial pressure than the liquid A.

Because of the higher pressure, when the metering valve 22 is open, the quantity of the liquid B flowing into the collection chamber 16 causes the corresponding quantity of the liquid A to be displaced out of the collection chamber 16 and back into the supply line 17. The opening period of the metering valve 22 determines the quantity of the liquid B that is stored before the liquid A in the collection chamber 16. The opening period for the metering valve 22, and thus the stored quantity of the liquid B, are predetermined by the control device 10 corresponding to the provided quantity ratio.

When the first actuator is activated, the armature 18 moves in the direction of the arrow 31, so the valve seat 14 and therefore the injection opening 13 are unblocked. Because the collection chamber 16 is now under the pressure of the liquid A, the quantity of the liquid B stored in the collection chamber 16 is injected into the reaction chamber with a corresponding quantity of the liquid A, as dictated by the opening period of the valve body 15. The quantity ratio of the stored liquid B to the liquid A is established by the opening time of the valve body 15. As soon as the valve body 15 is closed, the metering valve 22 can be re-opened, thereby allowing a new, corresponding quantity of the liquid B to be stored in the collection chamber 16. It is also possible, however, to use a control device, such as the control device 10 according to the embodiment shown in FIG. 1, to adapt not only the quantity ratio, but also the total injection quantity, to the changing operating requirements by matching the timing of the actuation of the actuators of the valve body 15 and the metering valve 22 in terms of opening times and the phase position of the opening times relative to one another. The first and second actuators correspond to the actuators for the valves 6 and 7 in FIG. 1.

The quantity ratio of the two liquids A and B, and the total injection quantity, can be fine-tuned through a corresponding actuation of the injection valve formed by the valve body 15 with its valve seat 14, on the one hand, and an actuation of the metering valve 22, on the other hand, involving appropriate opening strategies for these two valves relative to one another. It is also possible to inject a large total liquid quantity during the opening time of the injection valve through an intermittent opening of the metering valve 22, with correspondingly small quantities of liquids B and A flowing consecutively through the collection chamber 16. For this operating mode, it is advantageous for the supply pressures for the two liquids to be virtually identical.

Figure 3:
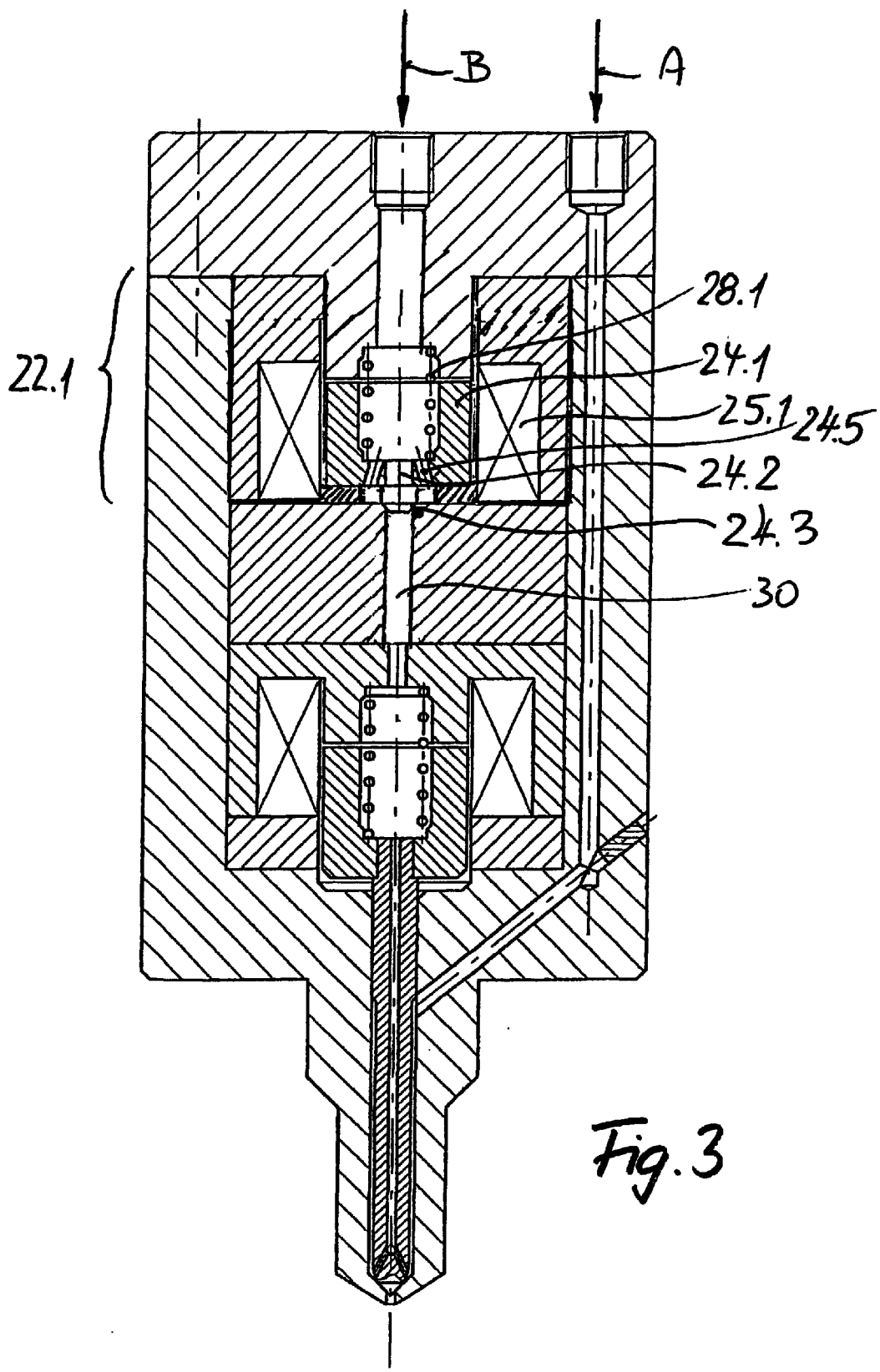
FIG. 3 a modified embodiment of an injection device.

FIG. 3 illustrates a modification of the embodiment according to FIG. 2. The modification differs from the original version solely in the design of the metering valve 22. In the embodiment according to FIG. 3, the metering valve 22.1 is not embodied as a check valve. The armature 24.1 is connected directly to a valve body 24.2, which is seated on a valve seat 24.3 at the passageway 30. A restoring spring 28.1 holds the valve body 24.2 in its closed position.

When the electromagnet 25.1 is actuated, the valve body 24.2 is raised from its valve seat 24.3 and the metering valve is opened, so the liquid B can flow into the collection chamber 16 over the duration of the valve opening time, as described above.

The injection device described in conjunction with FIGS. 2 and 3 can also be modified such that the metering valve can be inserted into the supply line 17 for the liquid A, while the supply line 21 for the liquid B discharges directly into the collection chamber. The discharges of the supply lines are advantageously reversed correspondingly in order to ensure that the quantity of liquid being introduced into the collection chamber via the metering valve is stored as close as possible to the nozzle opening 13.

Whereas, in the two illustrated embodiments, the opening of the metering valve is disposed as close as possible to the collection chamber 16, and is thus integrated into the housing 1 of the injection device, the metering valve can basically also be disposed outside of the injection device. The critical condition is that one of the two liquids can be stored, in a precisely metered quantity, in the collection chamber 16, so both liquids can be injected into the reaction chamber in a predetermined quantity ratio when the injection valve is opened.

Figure 4:
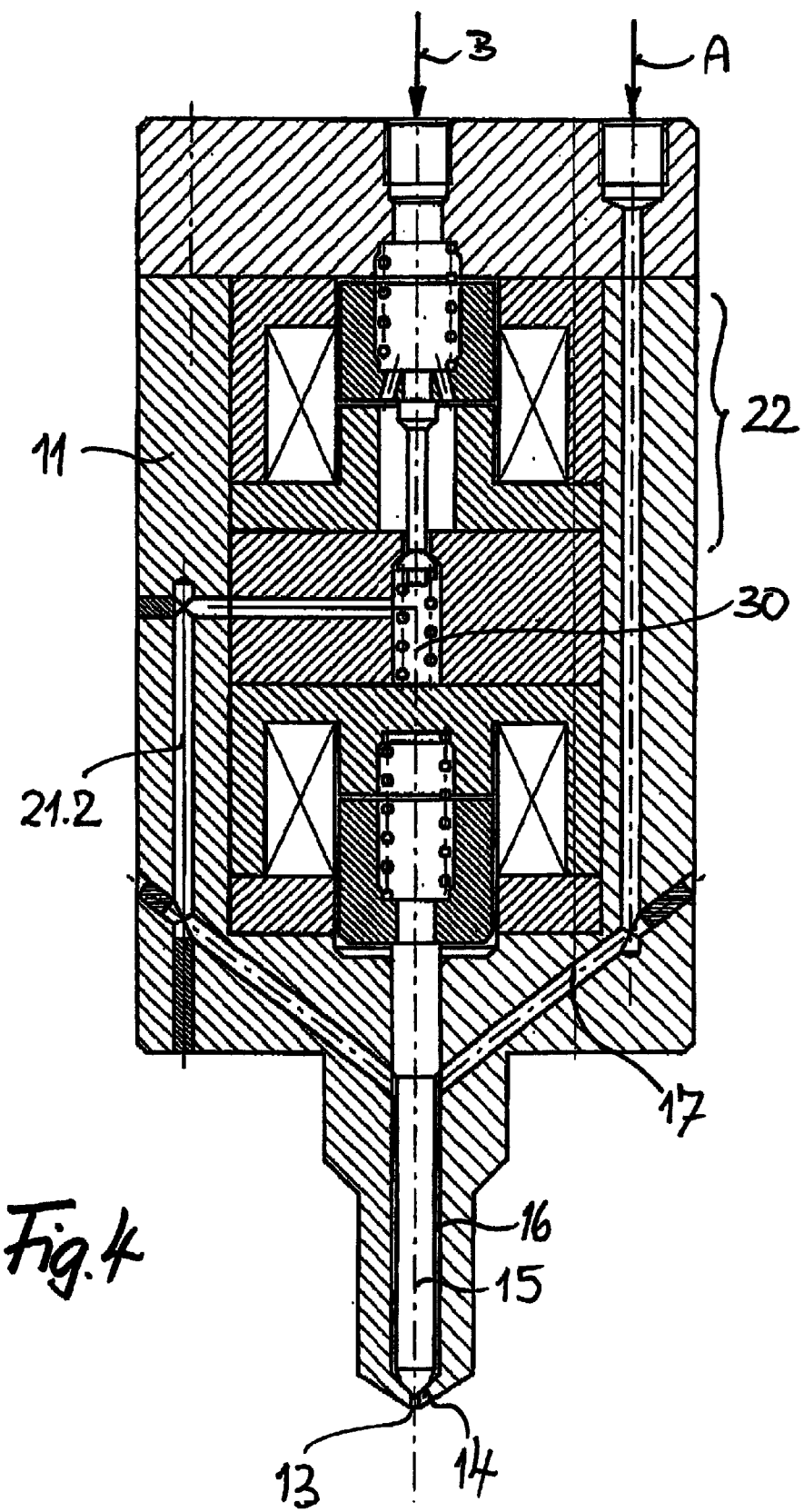
FIG. 4 a modification of the embodiment according to FIG. 2.

In FIG. 4, the modified version of the embodiment shown in FIG. 2 differs only in the method of supplying the liquid B to the collection chamber 16. Otherwise, the design corresponds to that in FIG. 2; refer to the above description. Identical components are provided with the same reference characters.

In the embodiment according to FIG. 4, the liquid B is supplied from the central connecting conduit 30 via a supply conduit 21.2 that leads through the housing 11 and discharges into the collection chamber 16 at approximately the height of the discharge of the supply line 17 for the liquid A. The valve body is solid in this case.

Figure 5:
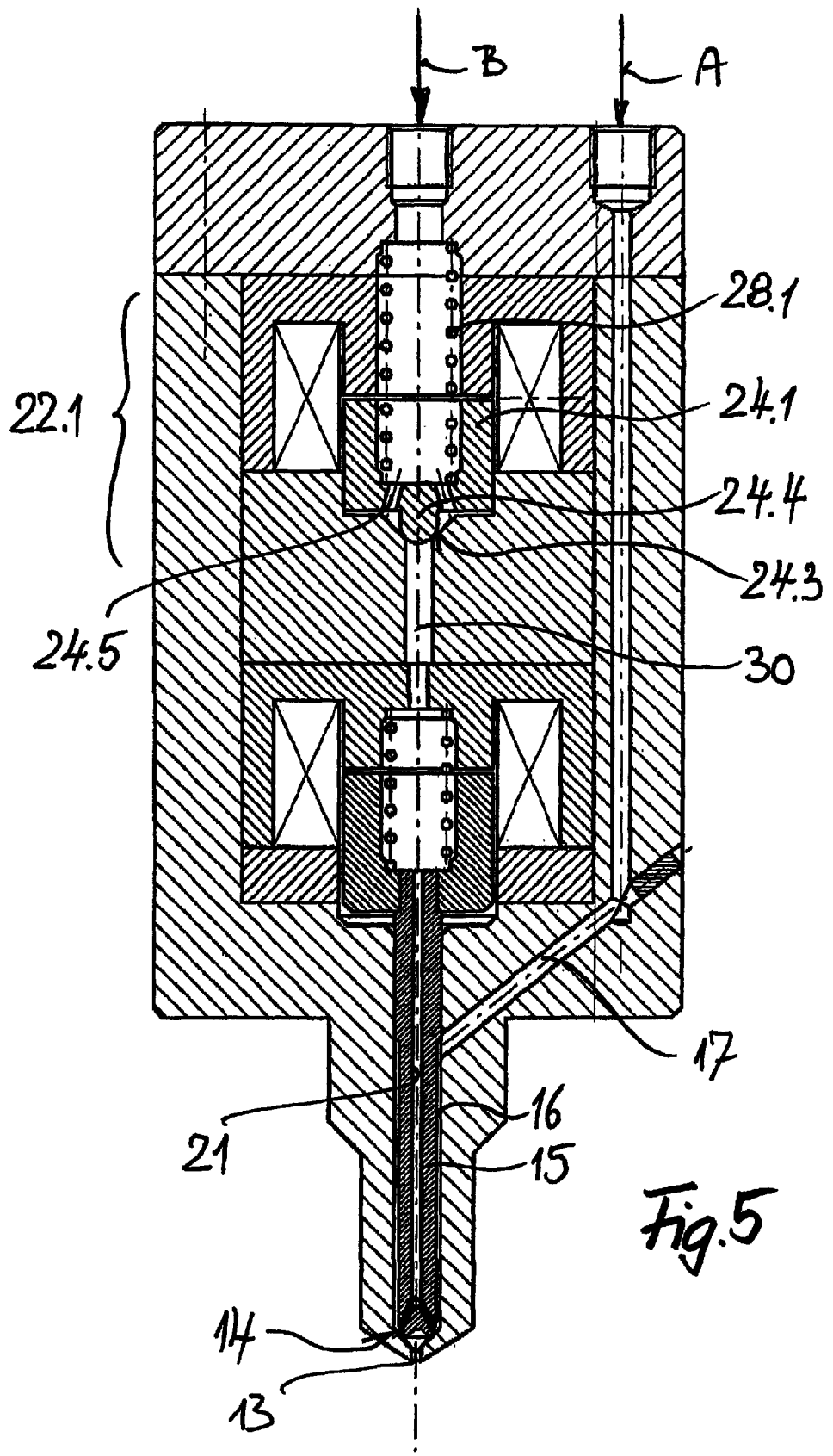
FIG. 5 a modification of the embodiment according to FIG. 3.

The embodiment according to FIG. 5 corresponds in design to the embodiment of FIG. 3; refer to the above description. Identical components are provided with the same reference characters.

In the embodiment according to FIG. 5, the metering valve 22.1 has a simpler design than in FIG. 3. The armature 24.1 has a projection 24.4 that is embodied as a valve body, is seated on the valve seat 24.3 at the central connecting conduit 30, and is held in the closed position by the restoring spring 28.1.

When the electromagnet 25.1 is supplied with current, the armature 24.1 is raised, thereby enabling the flow at the valve seat 24.3.

The metering valve 22.1 according to FIG. 5 can also be disposed as in the embodiment according to FIG. 4.

Depending on the application, it can be useful to provide a metering valve for each liquid supply line, so timing the two metering valves with an appropriate phase position relative to one another and using corresponding clock times allows the liquids to be conveyed in an exact quantity ratio when the injection valve is open.

What is claimed is:

1. An injection device for the metered injection of two liquids, in predeterminable quantity ratios, into a reaction chamber, the device having a housing that includes an injection nozzle, an opening of which forms an injection valve with a valve seat in the housing and a valve body that can be positioned on the valve seat; the valve body can be moved by a first actuator; a collection chamber of the device is associated with the nozzle opening, and is connected to a supply line for the first liquid and a supply line for the second liquid, with a metering valve being set up to block at least one supply line to the collection chamber, the valve being actuated by a second actuator; one of the two liquids is under a higher pressure than the other liquid; the device further has a control device, which can actuate the two actuators as a function of a load-stipulated total injection quantity and as a function of the predeterminable quantity ratio of the two liquids, with at least one valve being actuated in a clocked manner.

2. The device according to claim 1, characterized in that at least the metering valve is actuated in a clocked manner.

3. The device according to claim 1, characterized in that the collection chamber surrounds the valve body of the injection valve.

4. The device according to claim 1, characterized in that the valve body of the injection valve is needle-shaped in the region of the collection chamber.

5. The device according to claim 1, characterized in that the supply line for one of the two liquids extends in the valve body of the injection valve, and discharges via at least one discharge opening into the collection chamber.

6. The device according to claim 5, characterized in that the supply line for the other liquid discharges directly into the collection chamber via a discharge.

7. The device according to claim 1, characterized in that the discharge of the supply line for the liquid under higher pressure is disposed in the vicinity of the valve seat of the valve body.

8. The device according to claim 1, characterized in that the metering valve is associated with the supply line for the liquid under higher pressure.

9. The device according to claim 1, characterized in that the metering valve is embodied as a check valve that can be opened by way of the second actuator.

10. The device according to claim 9, characterized in that the metering valve embodied as a check valve can be opened in the flow-through direction.

11. The device according to claim 1, characterized in that the actuators are electromagnetic, with the movable valve bodies of the injection valve and the metering valve being respectively connected to an armature and a restoring spring that acts in the closing direction.

12. The use of the injection device according to claim 1 in a catalytic reformer for producing a gaseous fuel for a fuel cell.

* * * * *